United States Patent
Xu et al.

(10) Patent No.: US 10,284,311 B2
(45) Date of Patent: May 7, 2019

(54) RSRP AND PATH LOSS MEASUREMENTS WITH COVERAGE ENHANCEMENTS

(71) Applicant: QUALCOMM Incorporated, San Diego, CA (US)

(72) Inventors: Hao Xu, San Diego, CA (US); Renqiu Wang, San Diego, CA (US); Peter Gaal, San Diego, CA (US); Wanshi Chen, San Diego, CA (US); Yongbin Wei, La Jolla, CA (US); Madhavan Srinivasan Vajapeyam, San Diego, CA (US); Valentin Alexandru Gheorghiu, Tokyo (JP)

(73) Assignee: QUALCOMM Incorporated, San Diego, CA (US)

( * ) Notice: Subject to any disclaimer, the term of this patent is extended or adjusted under 35 U.S.C. 154(b) by 174 days.

(21) Appl. No.: 15/040,794

(22) Filed: Feb. 10, 2016

(65) Prior Publication Data

US 2016/0234856 A1 Aug. 11, 2016

Related U.S. Application Data

(60) Provisional application No. 62/115,110, filed on Feb. 11, 2015, provisional application No. 62/163,951, filed on May 19, 2015.

(51) Int. Cl.
*H04B 17/318* (2015.01)
*H04B 17/336* (2015.01)
(Continued)

(52) U.S. Cl.
CPC ......... *H04B 17/318* (2015.01); *H04B 17/336* (2015.01); *H04W 4/70* (2018.02); *H04L 5/0048* (2013.01)

(58) Field of Classification Search
CPC combination set(s) only.
See application file for complete search history.

(56) References Cited

U.S. PATENT DOCUMENTS

| 2008/0031370 A1 | 2/2008 | Guey et al. |
| 2013/0044665 A1* | 2/2013 | Ng .............. H04W 52/242 370/311 |

(Continued)

FOREIGN PATENT DOCUMENTS

WO  WO 2013006200 A1 * 1/2013 ............. H04B 15/00

OTHER PUBLICATIONS

Intel Corporation : "UE Power Consumption Reduction for MTC," 3GPP Draft; R1-150077—Intel Mtc Power Consumption, 3rd Generation Partnership Project (3GPP), Mobile Competence Centre ; 650, Route Des Lucioles ; F-06921 Sophia-Antipolis Cedex ; France 9 vol. RAN WG1, no. Athens, Greece; Feb. 9, 2015-Feb. 13, 2015 Feb. 8, 2015 (Feb. 8, 2015), XP050933292, Retrieved from the Internet: URL:http://www.3gpp.org/ftp/Meetings_3GPP_SYNC/RAN1/Docs/ [retrieved on Feb. 8, 2015], 4 pages.

(Continued)

*Primary Examiner* — Yee F Lam
(74) *Attorney, Agent, or Firm* — Patterson & Sheridan, L.L.P.

(57) ABSTRACT

Aspects of the present disclosure provided techniques that for wireless communications by a user equipment (UE). An exemplary method, performed by a UE, generally includes determining an additional set of resources to use to enhance measurement of one or more metrics indicative of channel conditions based on measurement of reference signals during a measurement procedure, wherein the additional set of resources are in addition to a defined set of resources used to measure the one or more metrics and performing the measurement procedure based at least on the reference (Continued)

signals, the additional set of resources, and one or more measurement parameters.

29 Claims, 8 Drawing Sheets

(51) Int. Cl.
*H04W 4/70* (2018.01)
*H04L 5/00* (2006.01)

(56) References Cited

U.S. PATENT DOCUMENTS

| | | | |
|---|---|---|---|
| 2013/0223235 A1* | 8/2013 | Hu | H04W 36/04 370/242 |
| 2014/0113677 A1* | 4/2014 | Parkvall | H04W 52/146 455/522 |
| 2016/0301505 A1* | 10/2016 | Furuskog | H04W 72/00 |
| 2018/0102823 A1* | 4/2018 | Sun | H04L 1/0026 |
| 2018/0115389 A1* | 4/2018 | Chen | H04L 1/00 |

OTHER PUBLICATIONS

International Search Report and Written Opinion—PCT/US2016/017582—ISA/EPO—dated Apr. 26, 2016.

LG Electronics : "Observation on PBCH Coverage Enhancement for MTC," 3GPP Draft; R1-134392 MTC PBCH CE EVAL (Final), 3rd Generation Partnership Project (3GPP), Mobile Competence Centre ; 650, Route Des Lucioles ; F-06921 Sophia-Antipolis Cedex ; France vol. RAN WG1, no. Guangzhou, China; Oct. 7, 2013-Oct. 11, 2013 Sep. 28, 2013 (Sep. 28, 2013), XP050717517, Retrieved from the Internet: URL:http://www.3gpp.org/ftp/tsg_ran/WG1_RL1/TSGR1_74b/Docs/ [retrieved on Sep. 28, 2013], 5 pages.

* cited by examiner

RSRP AND PATH LOSS MEASUREMENTS WITH COVERAGE ENHANCEMENTS

CLAIM OF PRIORITY UNDER 35 U.S.C. § 119

This application claims benefit of U.S. Provisional Patent Application Ser. Nos. 62/115,110, filed Feb. 11, 2015 and 62/163,951, filed May, 19, 2015, both of which are herein incorporated by reference in their entirety

BACKGROUND

I. Field

Certain aspects of the present disclosure generally relate to wireless communications and, more particularly, to reference signal received power (RSRP) and path loss measurements for certain wireless devices, such as machine type communication (MTC) devices with coverage enhancements.

II. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3rd Generation Partnership Project (3GPP) Long Term Evolution (LTE)/LTE-Advanced systems and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

A wireless communication network may include a number of base stations that can support communication for a number of wireless devices. Wireless devices may include user equipments (UEs). Some examples of UEs may include cellular phones, smart phones, personal digital assistants (PDAs), wireless modems, handheld devices, tablets, laptop computers, netbooks, smartbooks, ultrabooks, etc. Some UEs may be considered machine-type communication (MTC) UEs, which may include remote devices, such as sensors, meters, location tags, etc., that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example.

To enhance SIB acquisition of MTC devices with coverage enhancement for MTC services when it is unknown whether a network is configured with Multimedia Broadcast Multicast Service (MBMS) or Multi-Broadcast Single Frequency Network (MBSFN), the bandwidth and mode of the network may be used to determine a timing for acquiring system data.

SUMMARY

Certain aspects of the present disclosure provide techniques and apparatus for reference signal received power (RSRP) and path loss measurements by certain devices, such as machine type communication (MTC) UEs.

Certain aspects of the present disclosure provide a method for wireless communications by a user equipment (UE). The method generally includes determining an additional set of resources to use to enhance measurement of one or more metrics indicative of channel conditions based on measurement of reference signals during a measurement procedure, wherein the additional set of resources are in addition to a defined set of resources used to measure the one or more metrics and performing the measurement procedure based at least on the reference signals, the additional set of resources, and one or more measurement parameters.

Certain aspects of the present disclosure provide an apparatus for wireless communications. The apparatus generally includes at least one processor configured to determine an additional set of resources to use to enhance measurement of one or more metrics indicative of channel conditions based on measurement of reference signals during a measurement procedure, wherein the additional set of resources are in addition to a defined set of resources used to measure the one or more metrics and perform the measurement procedure based at least on the reference signals, the additional set of resources, and one or more measurement parameters. The apparatus also includes a memory coupled with the at least one processor.

Certain aspects of the present disclosure provide an apparatus for wireless communications. The apparatus generally includes means for determining an additional set of resources to use to enhance measurement of one or more metrics indicative of channel conditions based on measurement of reference signals during a measurement procedure, wherein the additional set of resources are in addition to a defined set of resources used to measure the one or more metrics and means for performing the measurement procedure based at least on the reference signals, the additional set of resources, and one or more measurement parameters.

Certain aspects of the present disclosure provide a non-transitory computer readable medium for wireless communications. The non-transitory computer readable medium generally includes instructions for determining an additional set of resources to use to enhance measurement of one or more metrics indicative of channel conditions based on measurement of reference signals during a measurement procedure, wherein the additional set of resources are in addition to a defined set of resources used to measure the one or more metrics and performing the measurement procedure based at least on the reference signals, the additional set of resources, and one or more measurement parameters.

Certain aspects of the present disclosure provide a method for wireless communications by a base station (BS). The method generally includes determining an additional set of resources to use to enhance measurement, by a user equipment (UE), of one or more metrics indicative of channel conditions based on measurement of reference signals during a measurement procedure, wherein the additional set of resources are in addition to a defined set of resources used to measure the one or more metrics and transmitting information to the UE regarding the additional set of resources.

Certain aspects of the present disclosure provide an apparatus for wireless communications. The apparatus generally includes at least one processor configured to determine an additional set of resources to use to enhance measurement, by a user equipment (UE), of one or more metrics indicative of channel conditions based on measurement of reference signals during a measurement procedure, wherein the additional set of resources are in addition to a defined set of resources used to measure the one or more metrics and transmit information to the UE regarding the additional set of resources.

Certain aspects of the present disclosure provide an apparatus for wireless communications. The apparatus generally includes means for determining an additional set of resources to use to enhance measurement, by a user equipment (UE), of one or more metrics indicative of channel conditions based on measurement of reference signals during a measurement procedure, wherein the additional set of resources are in addition to a defined set of resources used to measure the one or more metrics and means for transmitting information to the UE regarding the additional set of resources.

Certain aspects of the present disclosure provide a non-transitory computer readable medium for wireless communications. The non-transitory computer readable medium generally includes instructions for determining an additional set of resources to use to enhance measurement, by a user equipment (UE), of one or more metrics indicative of channel conditions based on measurement of reference signals during a measurement procedure, wherein the additional set of resources are in addition to a defined set of resources used to measure the one or more metrics and transmitting information to the UE regarding the additional set of resources.

Numerous other aspects are provided including methods, apparatus, systems, computer program products, and processing systems.

DETAILED DESCRIPTION

A machine type communication (MTC) UE may generally be required to make reference signal received power (RSRP) measurements needed for radio resource management (RRM), cell selection or reselection, path loss measurements needed for power control, and path loss measurements needed to identify coverage enhancement needs and selection of a random access channel (RACH) bundle size. However, at low SNRs, channel measurement accuracy may become an issue for MTC UEs due to certain operating constraints. Thus, aspects of the present disclosure provide techniques for improving measurement accuracy of metrics indicative of channel conditions for MTC UEs.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as universal terrestrial radio access (UTRA), cdma2000, etc. UTRA includes wideband CDMA (WCDMA), time division synchronous CDMA (TD-SCDMA), and other variants of CDMA. cdma2000 covers IS-2000, IS-95 and IS-856 standards. A TDMA network may implement a radio technology such as global system for mobile communications (GSM). An OFDMA network may implement a radio technology such as evolved UTRA (E-UTRA), ultra mobile broadband (UMB), IEEE 802.11 (Wi-Fi), IEEE 802.16 (WiMAX), IEEE 802.20, Flash-OFDM®, etc. UTRA and E-UTRA are part of universal mobile telecommunication system (UMTS). 3GPP Long Term Evolution (LTE) and LTE-Advanced (LTE-A), in both frequency division duplex (FDD) and time division duplex (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE/LTE-Advanced, and LTE/LTE-Advanced terminology is used in much of the description below. LTE and LTE-A are referred to generally as LTE.

Figure 1:
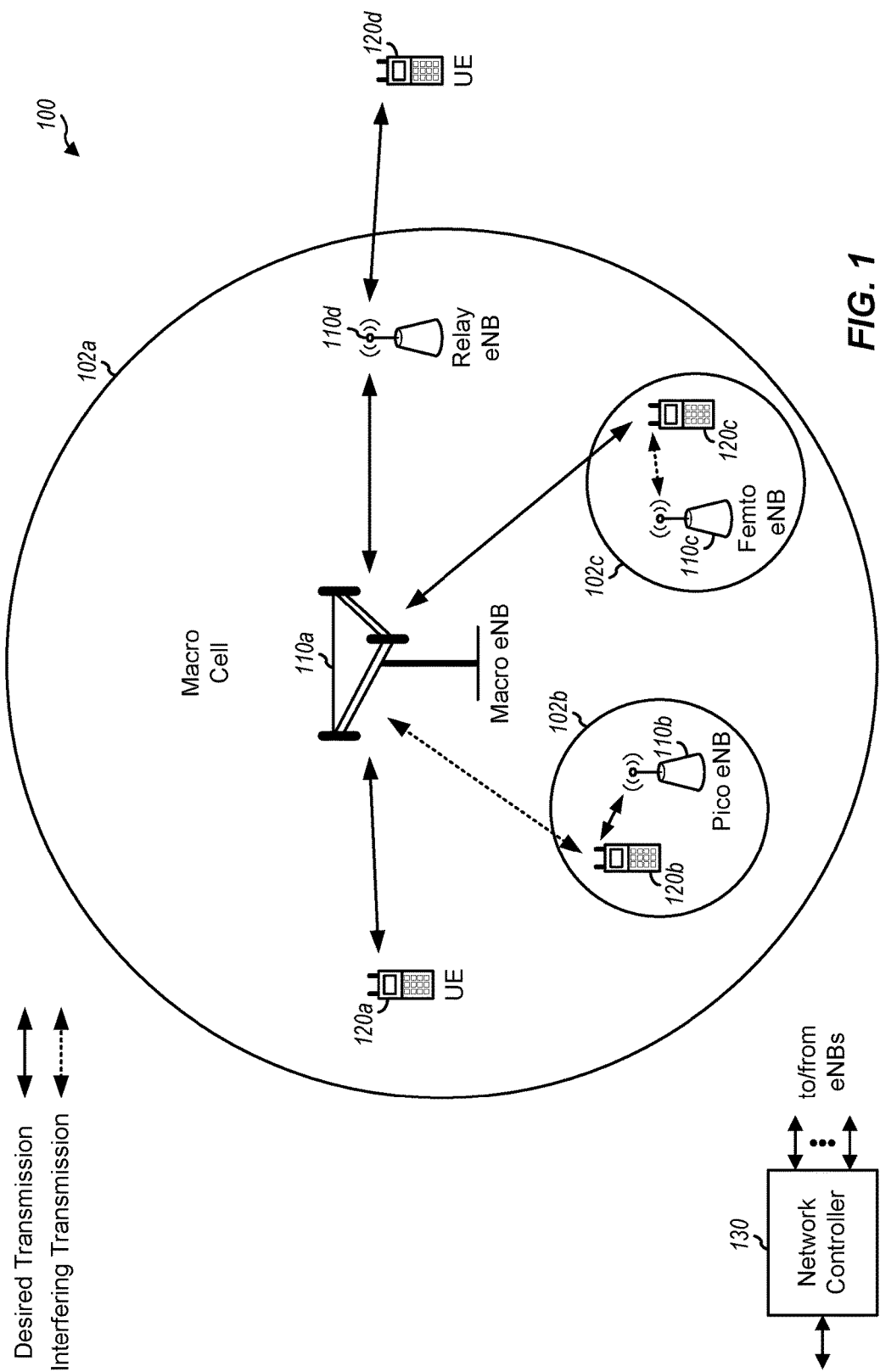
FIG. 1 is a block diagram conceptually illustrating an example of a wireless communication network, in accordance with certain aspects of the present disclosure.

FIG. 1 illustrates an example wireless communication network 100, in which aspects of the present disclosure may be practiced. For example, techniques presented herein may be used to assist UEs illustrated in FIG. 1 in improving measurement of metrics indicative of channel conditions.

The network 100 may be an LTE network or some other wireless network. Wireless network 100 may include a number of evolved Node Bs (eNBs) 110 and other network entities. An eNB is an entity that communicates with user equipments (UEs) and may also be referred to as a base station, a Node B, an access point, etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, an eNB 110a may be a macro eNB for a macro cell 102a, an eNB 110b may be a pico eNB for a pico cell 102b, and an eNB 110c may be a femto eNB for a femto cell 102c. An eNB may support one or multiple (e.g., three) cells. The terms "eNB", "base station" and "cell" may be used interchangeably herein.

Wireless network 100 may also include relay stations. A relay station is an entity that can receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay station 110d may communicate with macro eNB 110a and a UE 120d in order to facilitate communication between eNB 110a and UE 120d. A relay station may also be referred to as a relay eNB, a relay base station, a relay, etc.

Wireless network 100 may be a heterogeneous network that includes eNBs of different types, e.g., macro eNBs, pico eNBs, femto eNBs, relay eNBs, etc. These different types of eNBs may have different transmit power levels, different coverage areas, and different impact on interference in wireless network 100. For example, macro eNBs may have a high transmit power level (e.g., 5 to 40 Watts) whereas pico eNBs, femto eNBs, and relay eNBs may have lower transmit power levels (e.g., 0.1 to 2 Watts).

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a tablet, a smart phone, a netbook, a smartbook, an ultrabook, etc. In FIG. 1, a solid line with double arrows indicates desired transmissions between a UE and a serving eNB, which is an eNB designated to serve the UE on the downlink and/or uplink. A dashed line with double arrows indicates potentially interfering transmissions between a UE and an eNB.

Figure 2:
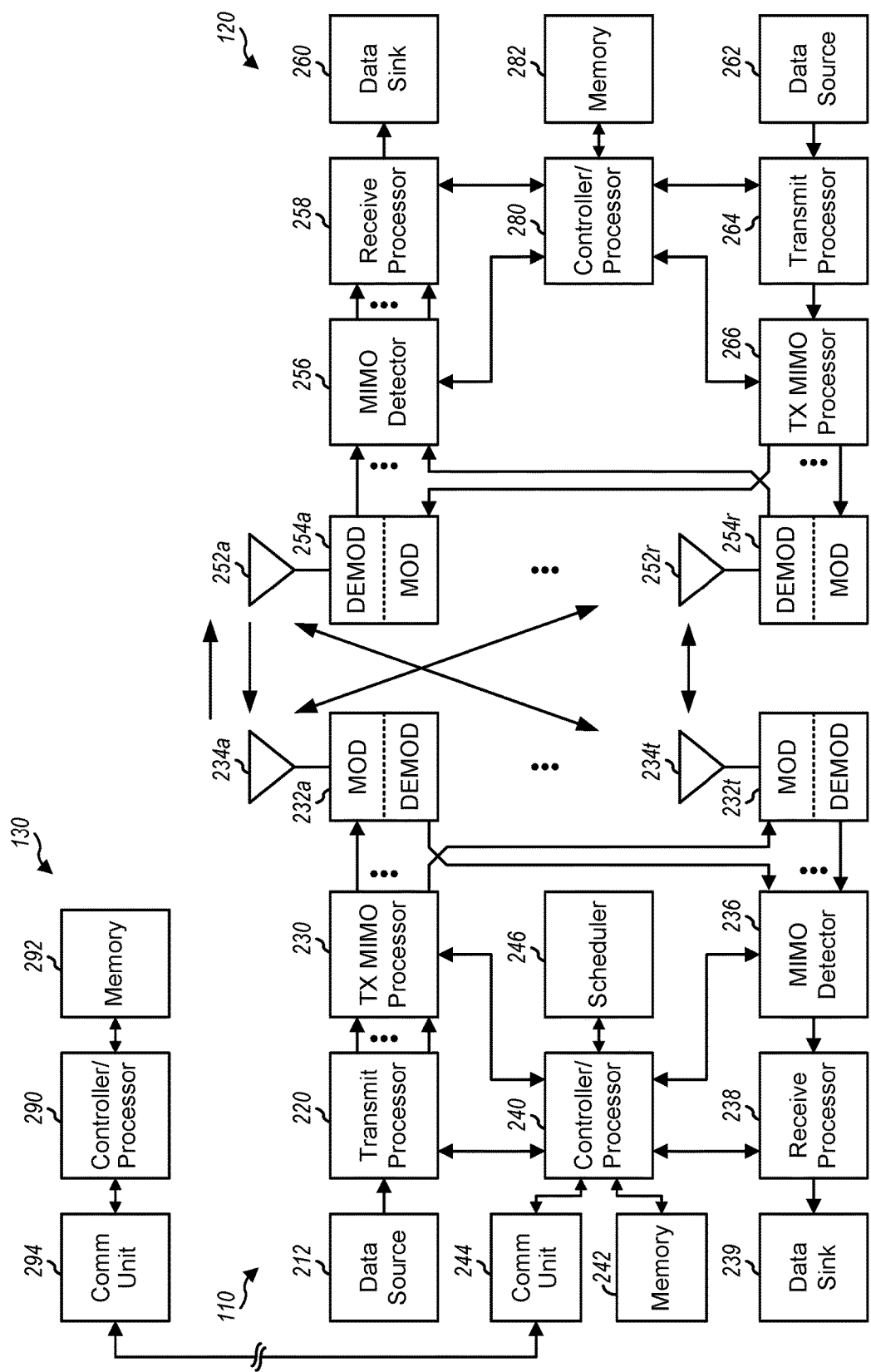
FIG. 2 shows a block diagram conceptually illustrating an example of a base station in communication with a user equipment (UE) in a wireless communications network, in accordance with certain aspects of the present disclosure.

FIG. 2 shows a block diagram of a design of base station/eNB 110 and UE 120, which may be one of the base stations/eNBs and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based on CQIs received from the UE, process (e.g., encode and modulate) the data for each UE based on the MCS(s) selected for the UE, and provide data symbols for all UEs. Transmit processor 220 may also process system information (e.g., for SRPI, etc.) and control information (e.g., CQI requests, grants, upper layer signaling, etc.) and provide overhead symbols and control symbols. Processor 220 may also generate reference symbols for reference signals (e.g., the CRS) and synchronization signals (e.g., the PSS and SSS). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) its received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine RSRP, RSSI, RSRQ, CQI, etc., for example, by using the technique presented herein.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by modulators 254a through 254r (e.g., for SC-FDM, OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controllers/processors 240 and 280 may direct the operation at base station 110 and UE 120, respectively. For example, processor 240 and/or other processors and modules at base station 110 may perform direct operations 700 shown in FIG. 7. Similarly, processor 280 and/or other processors and modules at UE 120, may perform or direct operations 600 shown in FIG. 6. Memories 242 and 282 may store data and program codes for base station 110 and UE 120, respectively, for example, for executing the operations illustrated in FIGS. 6 and 7. A scheduler 246 may schedule UEs for data transmission on the downlink and/or uplink.

Figure 3:
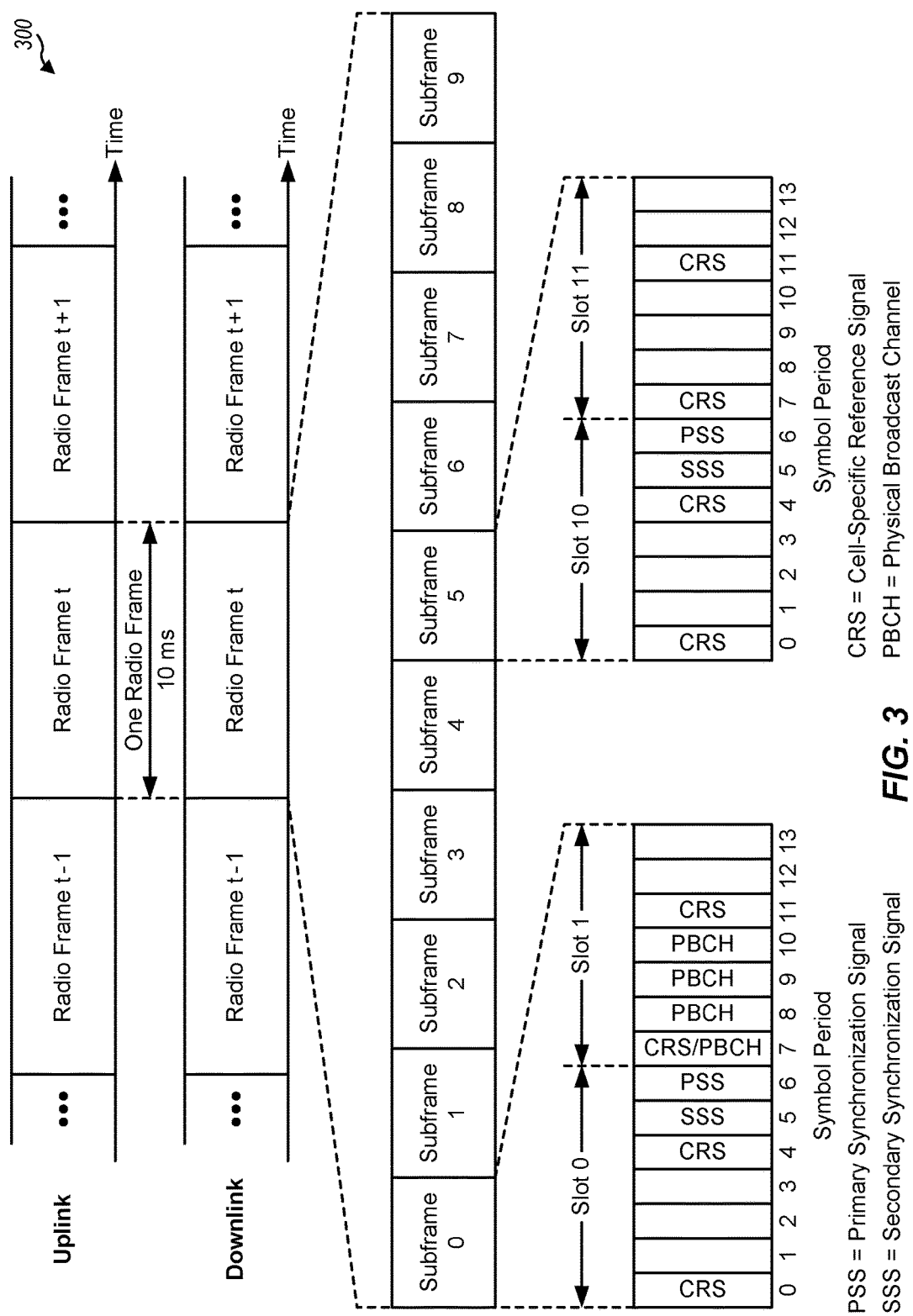
FIG. 3 is a block diagram conceptually illustrating an example of a frame structure in a wireless communications network, in accordance with certain aspects of the present disclosure.

FIG. 3 shows an exemplary frame structure 300 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L−1.

In LTE, an eNB may transmit a primary synchronization signal (PSS) and a secondary synchronization signal (SSS) on the downlink in the center of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition and may contain, among other information, the cell ID along with an indication of the duplexing mode. The indication of the duplexing mode may indicate whether the cell utilizes a time division duplexing (TDD) or frequency division duplexing (FDD) frame structure. The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a physical broadcast channel (PBCH) in symbol periods 0 to 3 in slot 1 of certain radio frames. The PBCH may carry some system information. The eNB may transmit other system information such as system information blocks (SIBs) on a physical downlink shared channel (PDSCH) in certain subframes. The eNB may transmit control information/data on a physical downlink control channel (PDCCH) in the first B symbol periods of a subframe, where B may be configurable for each subframe. The eNB may transmit traffic data and/or other data on the PDSCH in the remaining symbol periods of each subframe.

Figure 4:
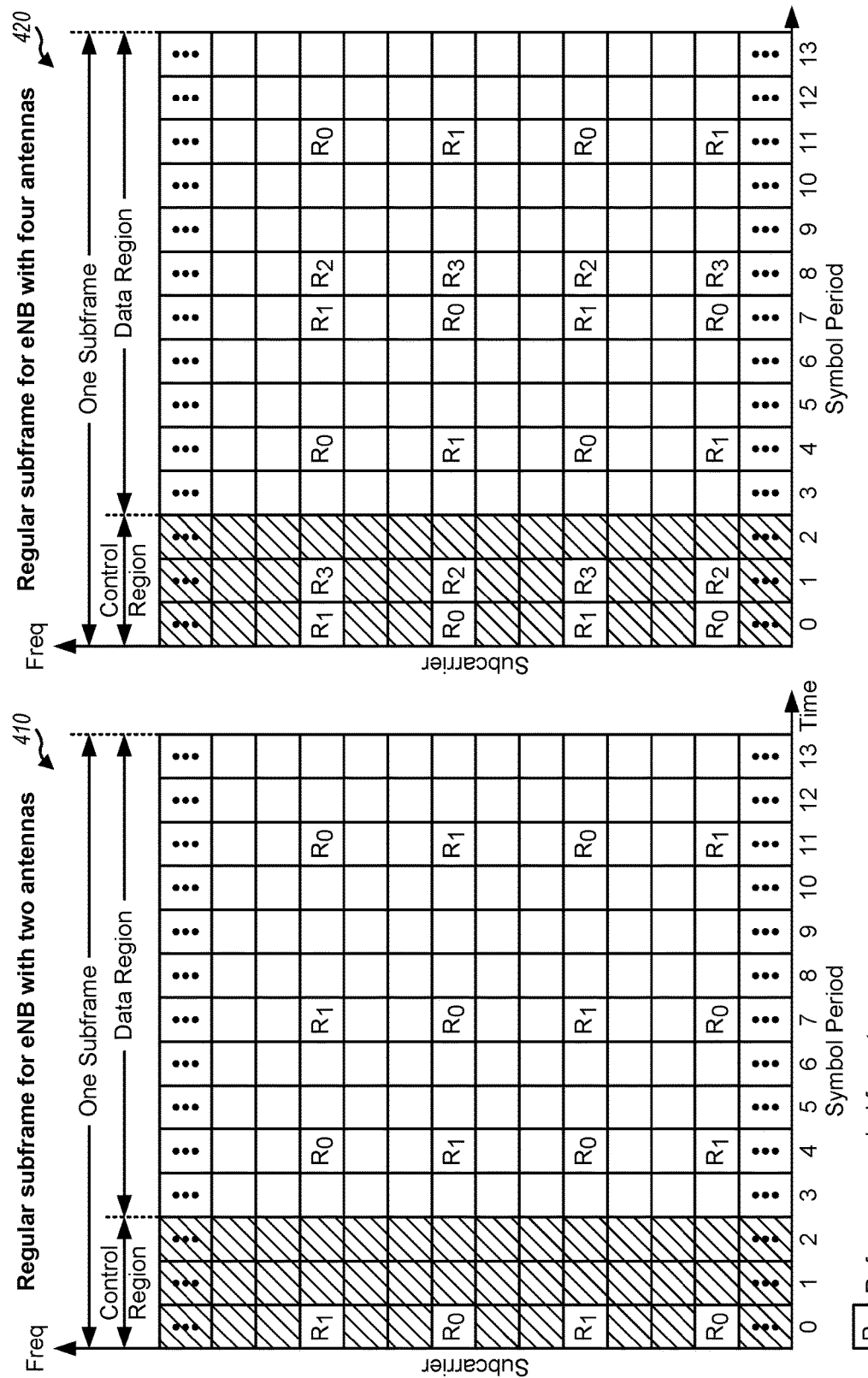
FIG. 4 is a block diagram conceptually illustrating two exemplary subframe formats with the normal cyclic prefix, in accordance with certain aspects of the present disclosure

FIG. 4 shows two exemplary subframe formats 410 and 420 with the normal cyclic prefix. The available time frequency resources may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7 and 11. A reference signal is a signal that is known a priori by a transmitter and a receiver and may also be referred to as pilot. A CRS is a reference signal that is specific for a cell, e.g., generated based on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based on cell ID. CRSs may be transmitted on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where q∈{0, . . . , Q−1}.

The wireless network may support hybrid automatic retransmission request (HARQ) for data transmission on the downlink and uplink. For HARQ, a transmitter (e.g., an eNB) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple eNBs. One of these eNBs may be selected to serve the UE. The serving eNB may be selected based on various criteria such as received signal strength, received signal quality, path loss, etc. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering eNBs.

An evolved Multimedia Broadcast and Multicast Service (eMBMS) in a Multimedia Broadcast Single Frequency Network (MBSFN) may be formed by the eNBs in a cell to form a MBSFN area. ENBs may be associated with multiple MBSFN areas, for example, up to a total of eight MBSFN areas. Each eNB in an MBSFN area synchronously transmits the same eMBMS control information and data. Each area may support broadcast, multicast, and unicast services. A unicast service is a service intended for a specific user, e.g., a voice call. A multicast service is a service that may be received by a group of users, e.g., a subscription video service. A broadcast service is a service that may be received by all users, e.g., a news broadcast. Thus a first MBSFN area may support a first eMBMS broadcast service, such as by providing a particular news broadcast to UE and a second MBSFN area may support a second eMBMS broadcast service, such as by providing a different news broadcast to second UE. Each MBSFN area supports a plurality of physical multicast channels (PMCH) (e.g., 15 PMCHs). Each PMCH corresponds to a multicast channel (MCH). Each MCH can multiplex a plurality (e.g., 29) of multicast logical channels. Each MBSFN area may have one multicast control channel (MCCH). As such, one MCH may multiplex one MCCH and a plurality of multicast traffic channels (MTCHs) and the remaining MCHs may multiplex a plurality of MTCHs. The subframes configured to carry the MBSFN information can vary depending on the diversity mode of the cell. In general, MBSFN can be carried in all subframes except those only available for DL to the UE and special subframes. For example, where the cell is configured for FDD, MBSFN may be configured in all subframes except 0, 4, 5, and 9. For TDD operations, MBSFN may be configured in all subframes except 0, 1, 5, and 6.

Example RSRP and Path Loss Measurement with Coverage Enhancements

As noted above, aspects of the present disclosure provide techniques for signalling control information to machine type communication (MTC) devices using a relatively narrowband of overall system bandwidth, as compared to other (non MTC) devices in the wireless communication network.

The focus of traditional LTE design (e.g., for legacy "non MTC" devices) is on the improvement of spectral efficiency, ubiquitous coverage, and enhanced quality of service (QoS) support. Current LTE system downlink (DL) and uplink (UL) link budgets are designed for coverage of high end devices, such as state-of-the-art smartphones and tablets, which may support a relatively large DL and UL link budget.

However, low cost, low rate devices need to be supported as well. For example, certain standards (e.g., LTE Release 12) have introduced a new type of UE (referred to as a category 0 UE) generally targeting low cost designs or machine type communications.

Figure 5:
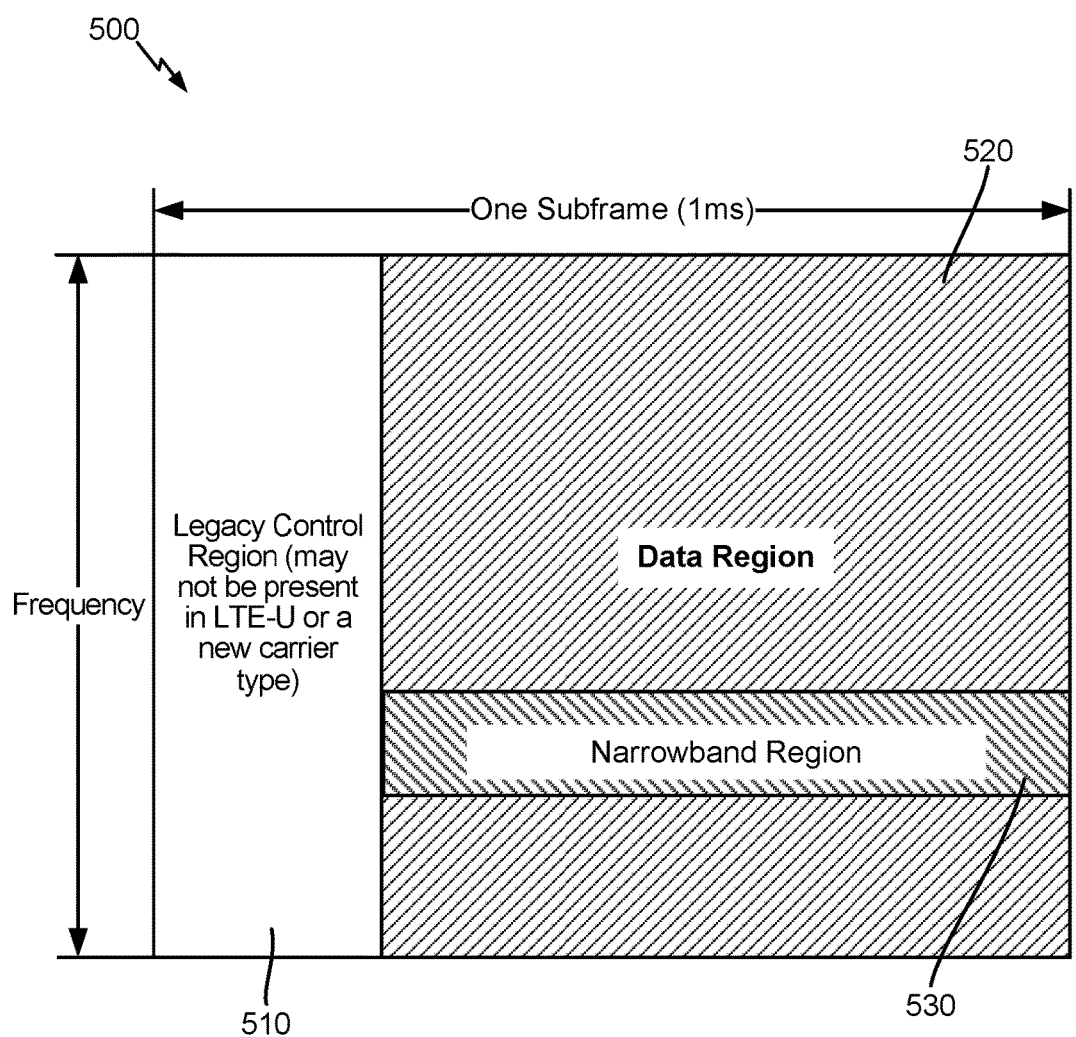
FIG. 5 illustrates an exemplary subframe configuration for eMTC, in accordance with certain aspects of the present disclosure.

FIG. 5 illustrates an example subframe structure 500 for MTC UEs that are able to support narrowband operation while operating in a wider system bandwidth (e.g., 1.4/3/5/10/15/20 MHz). In the example illustrated in FIG. 5, a conventional legacy control region 510 may span system bandwidth of a first few symbols, while a narrowband region 530 of the system bandwidth (spanning a narrow portion of a data region 520) may be reserved for an MTC physical downlink control channel (referred to herein as an mPDCCH) and for an MTC physical downlink shared channel (referred to herein as an mPDSCH). In some cases, an MTC UE monitoring the narrowband region may operate at 1.4 MHz or 6 resource blocks (RBs).

For machine type communications (MTC), various requirements may be relaxed as only a limited amount of information may need to be exchanged. For example, maximum bandwidth may be reduced (relative to legacy UEs), a single receive radio frequency (RF) chain may be used, peak rate may be reduced (e.g., a maximum of 100 bits for a transport block size), transmit power may be reduced, Rank 1 transmission may be used, and half duplex operation may be performed.

In some cases, if half-duplex operation is performed, MTC UEs may have a relaxed switching time to transition from transmitting to receiving (or receiving to transmitting). For example, the switching time may be relaxed from 20 μs for regular UEs to 1 ms for MTC UEs. Release 12 MTC UEs may still monitor downlink (DL) control channels in the same way as regular UEs, for example, monitoring for wideband control channels in the first few symbols (e.g., PDCCH) as well as narrowband control channels occupying a relatively narrowband, but spanning a length of a subframe (e.g., ePDCCH).

The MTC UE may also be a link budget limited device and may operate in different modes of operation (e.g. entailing different amounts of repeated messages transmitted to the MTC UE) based on its link budget limitation. For example, in some cases, the MTC UE may operate in a normal coverage mode in which there is little to no repetition (i.e., the amount of repetition needed for the UE to successfully receive a message may be low or repetition may not even be needed). Alternatively, in some cases, the MTC UE may operate in a coverage enhancement (CE) mode in which there may be high amounts of repetition (herein referred to as enhanced MTC (eMTC)). For example, for a 328 bit payload, an MTC UE in CE mode may need 150 or more repetitions of the payload in order to successfully receive the payload.

Enhanced coverage generally refers to (MTC/eMTC) device ability to be "covered" or served by a base station with a larger coverage area. The larger coverage area results in regions with corresponding lower signal quality. For example, in eMTC, the coverage may be extended by about 15 dB compared to Rel.8 LTE, which maps to 155.7 dB maximum coupling loss between the UE and eNB. As such, eMTC UEs in enhanced coverage may have to work reliably under very low SNR values (about −20 dB).

For example, eMTC UEs operating under very low SNR values may still be required to reliably make reference signal received power (RSRP) measurements needed for radio resource management (RRM), cell selection or reselection, path loss measurements needed for power control, and path loss measurements needed to identify coverage enhancement needs and selection of a random access channel (RACH) bundle size.

In some cases, RSRP measurements are performed using a pre-defined set of CRS resources, for example, using an average of 5 out of 200 subframes. In some cases, cell-specific reference signal (CRS) based RSRP measurements may be performed with 6 resource blocks (RBs). Generally, RSRP measurement performance is good with 2 receive (Rx) antennas at −6 dB. However, at low SNRs, as noted above, channel measurement accuracy may become an issue. For example, in some cases, channel measurement processing and procedure may not work at all at such low SNRs such as −15 dB to −20 dB. Thus, aspects of the present disclosure provide techniques for improving RSRP, path loss, and/or SNR measurement accuracy for MTC UEs.

Figure 6:
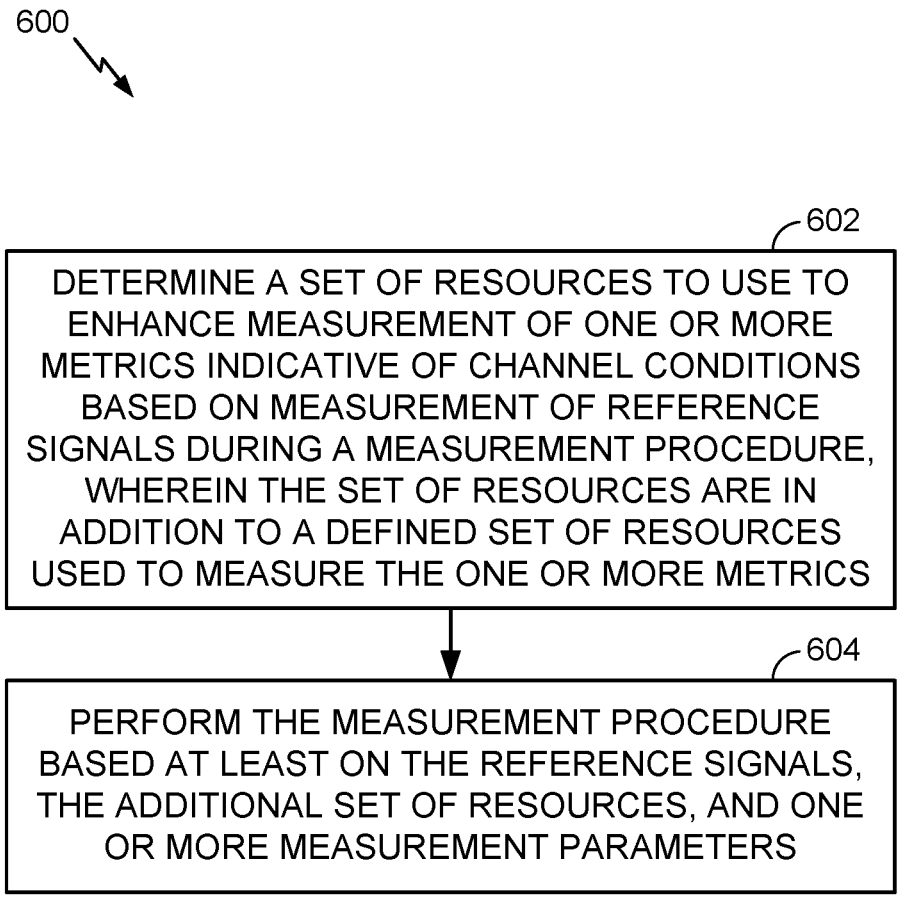
FIG. 6 illustrates example operations 600 that may be performed by a user equipment, in accordance with certain aspects of the present disclosure.

FIG. 6 illustrates example operations 600 for wireless communications, in accordance with aspects of the present disclosure. According to aspects, the operations 600 may be performed by a UE (e.g., UE 120).

Operations 600 begin at 602 by the UE determining an additional set of resources to use to enhance measurement of one or more metrics indicative of channel conditions based on measurement of reference signals during a measurement procedure, wherein the additional set of resources are in addition to a defined set of resources used to measure the one or more metrics. At 504, the UE performs the measurement procedure based at least on the reference signals, and the additional set of resources, and one or more measurement parameters.

Figure 7:
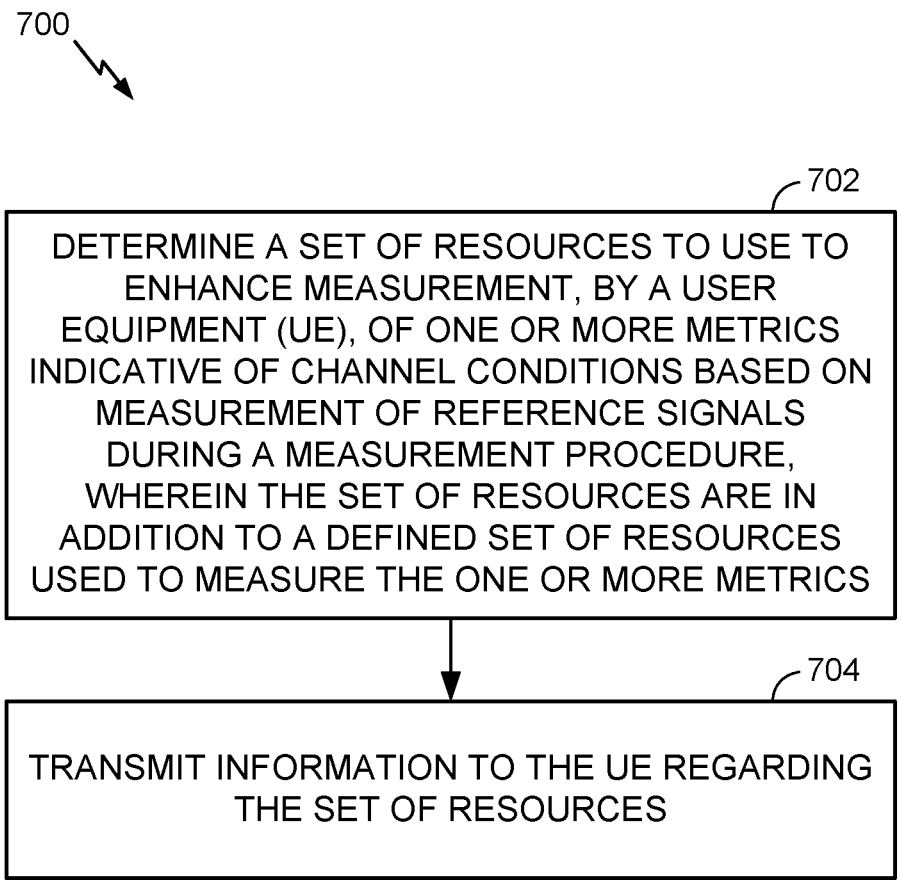
FIG. 7 illustrates example operations 700 that may be performed by a base station, in accordance with certain aspects of the present disclosure.

FIG. 7 illustrates example operations 700 for wireless communications, in accordance with aspects of the present disclosure. According to aspects, the operations 700 may be performed by an eNB (e.g., eNB 110).

Operations 700 begin at 702 by the eNB determining an additional set of resources to use to enhance measurement, by a user equipment (UE), of one or more metrics indicative of channel conditions based on measurement of reference signals during a measurement procedure, wherein the additional set of resources are in addition to a defined set of resources used to measure the one or more metrics. At 604, the eNB transmits information to the UE regarding the additional set of resources.

As noted above, aspects of the present disclosure provide techniques to improve measurement of metrics indicative of channel conditions (e.g., RSRP and path loss measurements) for MTC UEs during a measurement procedure. In some cases, these techniques may also apply to idle mode measurements.

For example, one technique may be to increase the number of subframes that may be used for RSRP and/or path loss measurements. Under this technique the number of subframes for reference signal (e.g., CRS) processing may be increased. In order to avoid possible multicast-broadcast single-frequency network (MBSFN) subframes, however, only subframes 0, 4, 5, and 9 may be used to obtain the additional CRS (i.e., the eNB may transmit additional CRSs in these subframes), which may result in 80 out of 200 possible subframes being used for CRS processing as compared to the average of 5 out of 200 subframes described above. Thus, an eNB may determine an additional set of CRS resources that a UE may use to improve accuracy of RSRP and/or path loss measurements and may transmit information regarding the additional set of resources to the UE. The UE may receive this information and may determine the additional set of resources to enhance measurement of RSRP, path loss, and/or SNR.

Another technique that may be used to increase RSRP and/or path loss measurement accuracy may be to use broadcast resources such as the physical broadcast channel (PBCH) and/or system information block (SIB). In some cases, when serving MTC UEs with coverage enhancements, these broadcast resources (i.e., the PBCH and SIB) may be repeated and/or bundled. According to certain aspects, these broadcast resources may be used as a reference signal (or "quasi-reference signal") like the CRS after a successful decoding of the payload. That is, assuming that a UE receives and successfully decodes the PBCH, PBCH tones may be used as pilots. For example, out of 200 subframes, 20 subframes may be configured for the PBCH, thus resulting in 4800 (20*240) additional resource elements (REs) that may be used for RSRP measurement purposes. Generally, the PBCH has dense tone spacing, which may result in better channel estimation.

While using broadcast resources (e.g., PBCH and SIB) as pilots may help improve RSRP and path loss measurements, using these broadcast resources may be potentially problematic if the transmit power of these resources is different than what the CRSs are being transmitted at. For example, the traffic to pilot ratio (T2P) of PBCH and SIB is not specified by the network, meaning that the eNB can potentially power boost these resources. Thus, assuming a 0 dB T2P (i.e., that the PBCH/SIB are transmitted at the same power as CRS) may lead to erroneous RSRP/path loss measurement results.

Thus, in order to solve the issue of erroneous RSRP/path loss measurement results when using the PBCH and/or SIB, the T2P (e.g., which may represent the ratio of power between the PBCH/SIB and CRS), may be signaled to the UE (e.g., by its serving eNB). The UE may then use the T2P to scale back the PBCH/SIB RSRP/path loss based measurements. According to certain aspects, an indication of the T2P may be signaled in the PBCH with a few fixed values or signal in SIB with a few fixed values. According to certain aspects, these fixed values may instruct the UE to increase or decrease (i.e., scale) the power of the PBCH/SIB when calculating RSRP/path loss. According to certain aspects, the T2P may be indicated using 2 bits in PBCH to identify 4 values relative to CRS. Additionally, 1 bit may be used to indicate whether PBCH has equal or different power from CRS. Additionally, the T2P indication may include an indication as to whether the T2P applies to the PBCH only or to both the PBCH and SIB1. Additionally, in some cases, the indication as to whether the T2P applies to the PBCH only or to both the PBCH and SIB1 may be skipped if it's predetermined in the system.

According to certain aspects, a UE may decode PBCH to determine whether and/or how it can use PBCH to determine RSRP and/or path loss. Additionally, the UE may decode the SIB to find out whether and/or how it can use PBCH and SIB to determine RSRP and/or path loss. For example, the T2P value signaled in SIB may be applied to the previously processed PBCH to adjust received signal power or path loss measurement values.

According to certain aspects, there may be different approaches for serving vs. other cells (e.g., neighboring cells). For example, if UE has to decode PBCH/SIB for its serving cell anyways, it can use these channels for RSRP measurements. Additionally, if the UE does not decode PBCH/SIB for its neighbor cell RSRP measurements, the UE may rely on more RSRP measurements from the other neighboring cell.

According to certain aspects, the SIB channel may be used to identify path loss. For example, an eNB generally always transmits the SIB assuming worst case user's coverage. So, all UEs being served by the eNB may use a decoded SIB to help in RSRP as well as path loss determination. According to certain aspects, with the signaling of T2P values, the RSRP and path loss may be combined with CRS based measurements and SIB based measurements.

As previously noted, the above techniques may help improve the accuracy of RSRP and path loss measurements. However, these techniques may result in higher power consumption if enhanced (i.e., using the techniques presented above) RSRP/path loss measurements are being performed. Thus, there is a need to determine when to use these enhanced RSRP/path loss measurement techniques According to certain aspects, the enhanced RSRP processing and/or path loss measurements may be triggered by certain conditions. For example, a UE may perform regular PSS/SSS/PBCH/SIB processing assuming it does not need large coverage enhancement. If the acquisition of PSS/SSS and/or PBCH decoding requires extended combining, e.g. exceeding certain acquisition time or number of PBCH decoding attempts, then UE may enter into an enhanced RSRP/PL measurement state. In such case, the UE may either increase CRS measurement (i.e., measuring CRS in subframes 0, 4, 5, and 9) or use broadcast resources (e.g., the RSRP and/or SIB).

According to certain aspects, the enhanced RSRP processing and/or path loss measurements may be triggered by an explicit or implicit network indication. For example, an eNB may transmit an explicit or implicit indication to a UE to perform the enhanced RSRP processing and/or path loss measurements. According to certain aspects, the implicit indication may involve the eNB configuring the UE with bundling or repetition of a physical layer channel (e.g., a paging channel, a broadcast channel, and/or a random access channel). According to certain aspects, the eNB may also provide the UE with an indication to stop performing the enhanced measurements.

According to certain aspects, the resulting RSRP/path loss measurements may be used, for example, to determine transmission parameters (e.g., transmission power and/or number of repetitions) for various transmissions. For example, in order for a UE to access the network, the UE has to perform the random access channel (RACH) procedure to establish the link to the eNB. At very low SNRs, the UE may have to use multiple transmissions (a number of repetitions, sometimes referred to as a "bundle size") in order to ensure the eNB can reliably decode the RACH message. Thus, transmission parameters such as the power level and/or number of repetitions used in the random access procedures may be based on the RSRP level and/or path loss measured by the UE.

On one hand, however, power consumption is important for eMTC UEs (that may transmit infrequently, but be required to operate for years off a battery). As such, performing measurements of RSRP and/or path loss, for example, in accordance with the techniques described able, should be optimized so that the UE may save as much power as possible. From this point of view, it is desirable that the UE performs these measurements as seldom as possible as taking measurements consumes power.

On the other hand, the RACH procedure may also consume a lot of power because the UE has to transmit signals at high power or with larger bundle size. If the UE chooses the wrong parameters for the RACH procedure (e.g., based on inaccurate measurements) it may waste a lot of power and/or the RACH procedure may not be successful. Hence, it may be desirable for the UE to choose the right RACH parameters on the first try.

In order for the UE to choose the right RACH parameters, however, it has to measure RSRP very accurately. Thus, these two design goals are typically in contention, from a power consumption point of view. This presents a tradeoff, where a UE should take just enough measurements to be accurate enough to allow selection of proper transmission parameters to avoid wasting power during the RACH procedure.

Thus, aspects of the present disclosure additionally provide techniques that allow one or more parameters of the measurement procedure (i.e., the RSRP and/or path loss measurement procedure, for example, as described above) to be adapted based on various conditions. For example, more accurate measurements may be needed before performing an access procedure than are needed after. Further, one or more parameters of the measurement procedure may be adapted based on a previous and/or current measurement result.

For example, different measurement parameters may be used before and after performing a RACH procedure. In some cases, the UE may perform more measurements (e.g., with a higher sampling rate and/or longer averaging) before it performs the access procedure to improve the measurement accuracy. For example, if the UE normally has to take 1 measurement sample every 50 ms to meet (normal) accuracy requirements, the UE may adapt the measurement procedure (e.g., by selecting a sampling rate parameter) to sample every 20 ms before the RACH procedure is performed.

As an alternative, the UE may wake up (to sample) at the same frequency, but in each wake up, the UE may apply longer averaging according to an averaging parameter. For example, the UE may wake up every 50 ms (before and after the RACH procedure), but instead of averaging for N1 subframes, the UE may set the averaging parameter to allow the UE to average over N2>N1 subframes before the RACH procedure. In some cases, the UE may adapt both sampling frequency and averaging period.

Figure 8A:
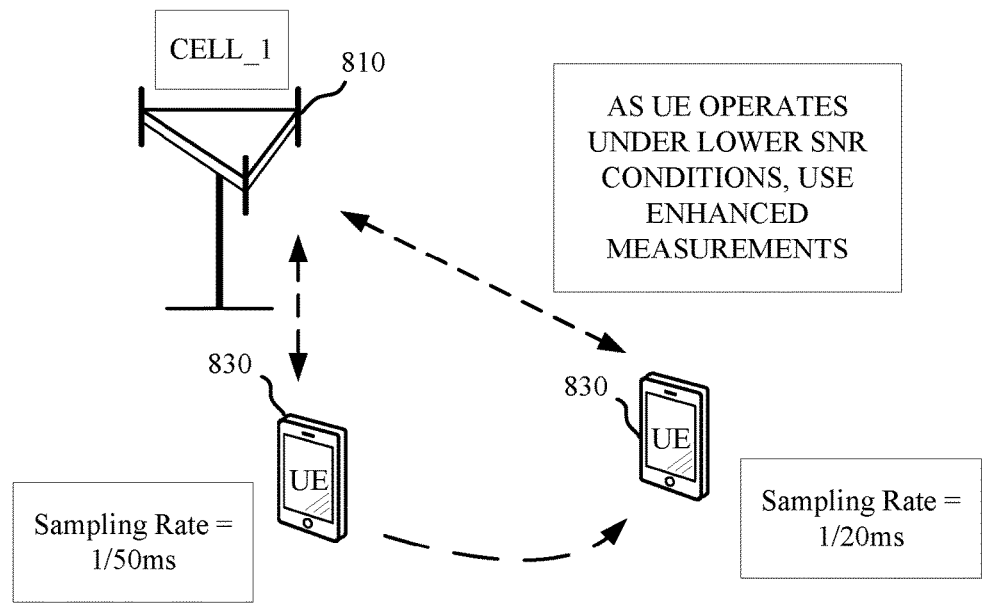
FIGS. 8A and 8B illustrate example enhanced measurement procedures, in accordance with certain aspects of the present disclosure.
Figure 8B:
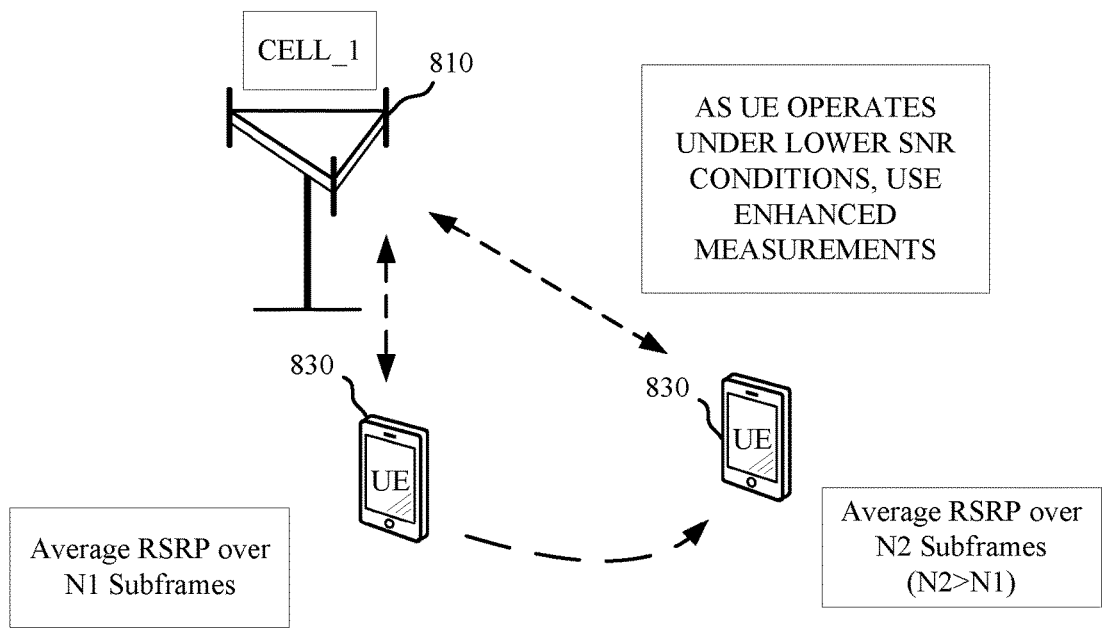

According to certain aspects, measurements procedures may be adapted depending on previous measurements. For example, this approach may be particularly effective for stationary devices (e.g. a meter device above the ground vs. in a basement). Upon installation of such devices, the device may perform RSRP measurements to determine the path loss to the strongest base station. For example, as illustrated in FIGS. 8A and 8B, if a UE 830 is in a low SNR condition (e.g., having moved relatively far away from a base station 810), the UE may perform extended RSRP measurements (e.g., higher sample rate and/or longer averaging period). If the UE it is in a good SNR condition, the UE may perform RSRP with less sampling (and/or a shorter averaging period).

According to certain aspects, measurements procedures may be adapted depending on channel conditions. As an example, a UE may adapt RSRP measurements depending on channel conditions. For UEs in good coverage, the UE may perform RSRP measurements less frequently and for UEs in bad coverage, the UE may perform RSRP measurements more frequently.

In some cases, adaptation based on channel conditions may be performed based on a current or previous RSRP level. In some cases, the RACH transmission parameters may likely be split into different quantization levels, corresponding to different ranges of RSRP levels. For example, parameter set 1 may be used for $-20$ dB$<$RSRP$<-15$ dB, parameter set 2 for $-15$ dB$<$RSRP$<-10$ dB, and the like.

According to certain aspects, if the UE measures a level close to the middle of a range for a set after sufficient samples (for example $-12.5$ dB for the range $-15$ dB$<$RSRP$<-10$ dB mentioned above), the UE may continue to measure with low sampling rate. If the UE measures a level close to a range boundary (e.g. close to $-15$ dB for the same range) the UE may continue to measure with a higher sampling rate to gain better accuracy and choose the correct transmission parameter set. An alternative may be to have adaptation based on measurement variance. For example, at high SNR, e.g. 10 dB, the variance from the initial measurements may be significantly less than devices at low SNR, e.g. $-15$ dB.

As described above, aspects of the present disclosure provide techniques that may be applied, at a UE, to enhance measurements (e.g., by increasing a number of subframes that may be used for measurements, using a broadcast resources in addition to predefined resources used for measurements, using higher measurement sampling rate and/or longer averaging) based on a procedure being performed (e.g., before performing RACH procedure). In some cases, enhanced measurements may be used based on a previous measured/stored path loss or coverage information. In some cases, a UE may adapt the measurement sampling rate/ average duration based on some preliminary/intermediary measurement (such as a single measurement of multiple to be averaged).

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the corresponding functions. The means may include various hardware and/or software/firmware component(s) and/or module(s), including, but not limited to a circuit, an application specific integrated circuit (ASIC), or processor. Generally, where there are operations illustrated in Figures, those operations may be performed by any suitable corresponding counterpart means-plus-function components.

For example, means for determining and/or means for performing may include one or more processors, such as the receive processor 258 and/or the controller/processor 280 of the user terminal 120 illustrated in FIG. 2 and/or the transmit processor 220 and/or the controller/processor 240 of the base station 110 illustrated in FIG. 2. Means for receiving may comprise a receive processor (e.g., the receive processor 258) and/or an antenna(s) 252 of the user terminal 120 illustrated in FIG. 2. Means for transmitting may comprise a transmit processor (e.g., the transmit processor 220) and/or an antenna(s) 234 of the eNB 110 illustrated in FIG. 2.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or combinations thereof.

Those of skill would further appreciate that the various illustrative logical blocks, modules, circuits, and algorithm steps described in connection with the disclosure herein may be implemented as electronic hardware, software/firmware, or combinations thereof. To clearly illustrate this interchangeability of hardware and software/firmware, various illustrative components, blocks, modules, circuits, and steps have been described above generally in terms of their functionality. Whether such functionality is implemented as hardware or software/firmware depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software/firmware module executed by a processor, or in a combination thereof. A software/firmware module may reside in RAM memory, flash memory, ROM memory, EPROM memory, EEPROM memory, phase change memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software/firmware, or combinations thereof. If implemented in software/firmware, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD/DVD or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software/firmware is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communications by a user equipment (UE), comprising:
    performing a first measurement procedure based on a first set of resources to determine a metric indicative of a channel condition;
    determining a second set of resources to use to enhance measurement of the metric indicative of the channel condition, wherein the second set of resources includes resources used for data or system information transmission during the first measurement procedure; and
    performing a second measurement procedure based at least on the second set of resources and one or more measurement parameters.

2. The method of claim 1, wherein the metric comprises at least one of a signal to noise (SNR), a reference signal received power (RSRP), or a path loss measurement.

3. The method of claim 1, further comprising determining when to perform the second measurement procedure based on one or more trigger conditions, wherein the second measurement procedure is performed only if the one or more trigger conditions are met.

4. The method of claim 3, wherein the one or more trigger conditions comprise at least one of:
    processing of one or more channels exceeding a threshold amount of time; or
    processing of one or more channels exceeding a threshold number of decoding attempts.

5. The method of claim 3, wherein the one or more trigger conditions comprises at least one of:
    receiving an explicit network indication; or
    receiving an implicit network indication.

6. The method of claim 5, wherein the implicit network indication comprises the user equipment being configured with bundling or repetition of a physical layer channel.

7. The method of claim 1, wherein the second set of resources comprise additional reference signals.

8. The method of claim 7, wherein the second set of resources are transmitted in non-MBSFN (Multicast Broadcast Single Frequency Network) subframes.

9. The method of claim 1, wherein the second set of resources comprise at least one broadcast resource, and wherein the broadcast resource comprises at least one of a physical broadcast channel (PBCH) or a master information block (MIB).

10. The method of claim 9, wherein the performing the second measurement procedure based at least on the second set of resources is based on the broadcast resource being successfully decoded.

11. The method of claim 9, further comprising performing scaling to compensate for a difference in a transmit power of the broadcast resource relative to a transmit power of the first set of resources.

12. The method of claim 9, further comprising receiving signaling indicating at least one of:
whether the broadcast resource and first set of resources are transmitted at a same power level;
a difference in a transmit power of the broadcast resource relative to a transmit power of the first set of resources; or
a type of broadcast resource that the difference in transmit power applies to.

13. The method of claim 12, wherein the signaling is provided via one or more bits in a system information block (SIB).

14. The method of claim 1, further comprising:
determining the one or more measurement parameters based on at least one condition; and
selecting one or more transmission parameters based on the metric indicative of the channel condition obtained from performing the second measurement procedure.

15. The method of claim 14, wherein the one or more transmission parameters comprise at least one of:
a transmission power for a transmission; or
a number of repetitions used for a transmission.

16. The method of claim 14, wherein the at least one condition relates to whether or not the UE has performed an access procedure.

17. The method of claim 16, wherein determining the one or more measurement parameters comprises selecting a sampling rate, such that a higher sampling rate is used prior to performing the access procedure relative to a sampling rate used after the access procedure.

18. The method of claim 16, wherein determining the one or more measurement parameters comprises selecting an averaging period over which one or more reference signal measurements are averaged, such that a longer averaging period is used prior to performing the access procedure relative to an averaging procedure used after the access procedure.

19. The method of claim 18, wherein the averaging period is selected such that the one or more reference signal measurements are averaged over an increased number of subframes prior to performing the access procedure relative to a number of subframes over which the reference signals are measured after the access procedure.

20. The method of claim 14, wherein the at least one condition is based, at least in part, on one or more previous measurement results.

21. The method of claim 20, wherein determining the one or more measurement parameters comprises selecting a sampling rate, such that a lower sampling rate is used if one or more previous measurement results indicate a path loss to a base station below a threshold value.

22. The method of claim 20, wherein the at least one condition is based, at least in part, on a current measurement result.

23. The method of claim 22, wherein the determining comprises selecting a set of one or more measurement parameters based, at least in part, on a variance in a current reference signal received power (RSRP) measurement relative to the one or more previous measurement results.

24. The method of claim 14, wherein the selecting the one or more transmission parameters is further based on a previous reference signal received power (RSRP) measurement or a current RSRP measurement.

25. The method of claim 24, wherein each of the one or more transmission parameters is associated with a range of RSRP measurement values.

26. The method of claim 25, wherein the selecting the one or more measurement parameters is further based on a proximity of an RSRP measurement value to a boundary between ranges of RSRP measurement values.

27. An apparatus for wireless communications, comprising:
at least one processor configured to:
perform a first measurement procedure based on a first set of resources to determine a metric indicative of a channel condition;
determine a second set of resources to use to enhance measurement of the metric indicative of the channel condition, wherein the second set of resources includes resources used for data or system information transmission during the first measurement procedure; and
perform a second measurement procedure based at least on the second set of resources and one or more measurement parameters; and
a memory coupled with the at least one processor.

28. A method for wireless communications by a base station (BS), comprising:
transmitting a first set of resources to be used by a user equipment (UE) in order to perform a first measurement procedure to determine a metric indicative of a channel condition;
determining a second set of resources to be used by the UE in order to enhance measurement of the metric indicative of the channel condition, wherein the second set of resources includes resources used for data or system information transmission during the transmission of the first set of resources; and
transmitting the second set of resources to the UE.

29. An apparatus for wireless communications, comprising:
at least one processor configured to:
transmit a first set of resources to be used by a user equipment (UE) in order to perform a first measurement procedure to determine a metric indicative of a channel condition;
determine a second set of resources to be used by the UE in order to enhance measurement of the metric indicative of the channel condition, wherein the second set of resources includes resources used for data or system information transmission during the transmission of the first set of resources; and
transmit the second set of resources to the UE; and
a memory coupled with the at least one processor.

* * * * *